May 18, 1965  W. B. NOLAND  3,183,536
PORTABLE DOCK PLATE PLATFORM

Filed June 5, 1961  2 Sheets-Sheet 1

INVENTOR.
WAYNE B. NOLAND
BY Talbert Dick & Jarley
ATTORNEYS

WITNESS
NORMAN G. TRAVISS

May 18, 1965 W. B. NOLAND 3,183,536
PORTABLE DOCK PLATE PLATFORM
Filed June 5, 1961 2 Sheets-Sheet 2

INVENTOR.
WAYNE B. NOLAND
BY Talbert Dick & Barley
ATTORNEYS

WITNESS
NORMAN G. TRAVISS

3,183,536
PORTABLE DOCK PLATE PLATFORM
Wayne B. Noland, Avon Lake, Iowa, assignor to Woodford Manufacturing Company, Des Moines, Iowa, a corporation of Iowa
Filed June 5, 1961, Ser. No. 114,915
4 Claims. (Cl. 14—72)

This invention relates to loading and unloading dock plates and, more particularly to a plate platform that may be engaged, lifted, and carried to point of use by a fork type tractor without the necessity of the operator of the tractor dismounting from the tractor.

Dock plates are extensively used and are usually employed to bridge the space between two spaced apart supporting surfaces, such as that of a loading or unloading dock and the bed of a hauling vehicle or like. Such dock plates or platforms are usually of iron and quite heavy. Their transportation and/or placement are therefore most difficult. In many cases they are handled by the hydraulic lifting fork of a tractor, but obviously they must be first secured to and then detached from the fork by some means such as chains, cables, clamps, or like. This requires the services of an extra helper, or else the operator of the tractor must dismount and remount at least twice to accomplish the mission of placing the dock plate into the desired position.

Therefore, one of the principal objects of this invention is to provide a dock plate platform that may be engaged, picked up and moved by a fork type tractor without necessitating the dismounting of the operator of the tractor.

More specifically, the object of this invention is to provide a dock plate having a hinged bail member that may be effectively engaged by the arms of a lifting tractor for transporting the dock plate from place to place.

A further object of this invention is to provide a dock platform that has a movable hinged bail portion, but one that does not interfere with the normal use of the platform.

Still further objects of this invention are to provide an efficient dock plate platform that is economical in manufacture and durable in use.

These and other objects will be apparent to those skilled in the art.

Figure 1:
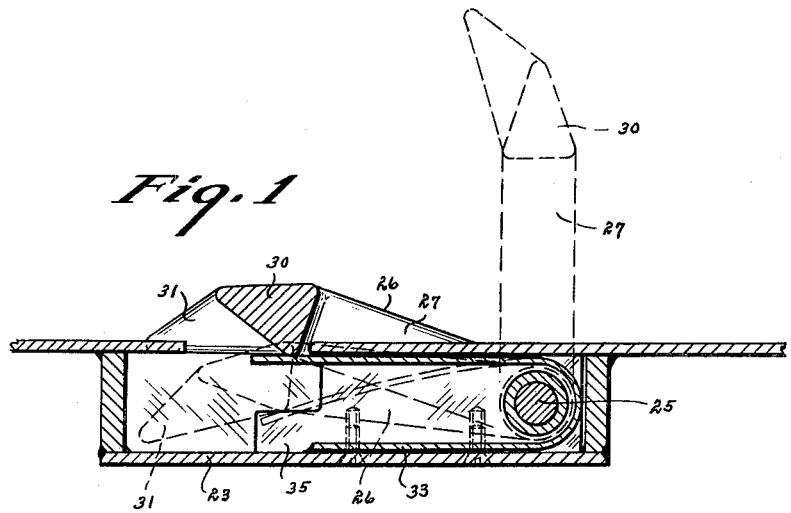
Figure 2:
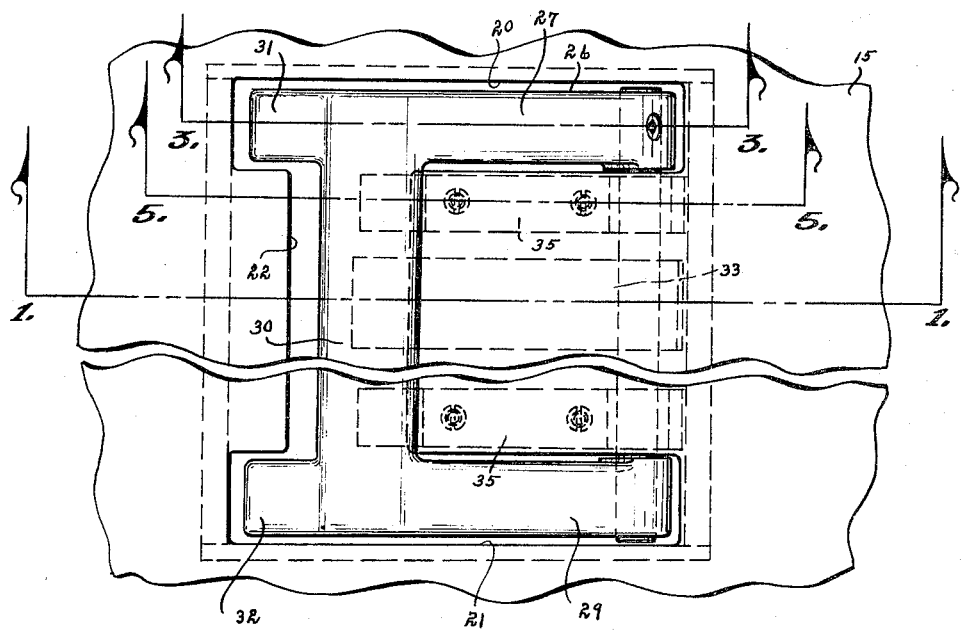
Figure 5:
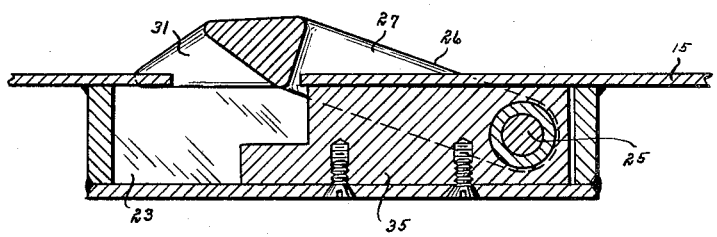
Figure 4:
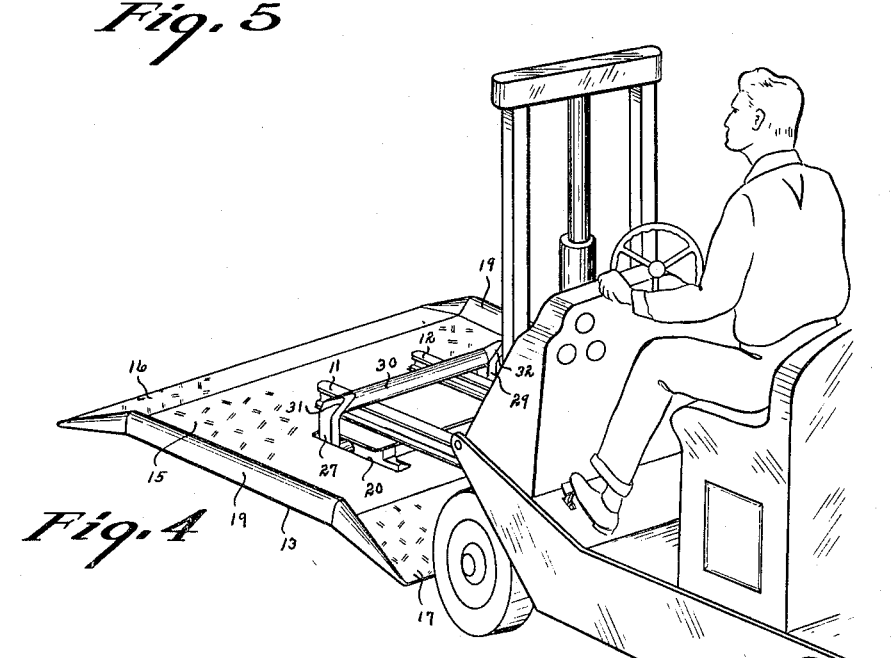
Figure 3:
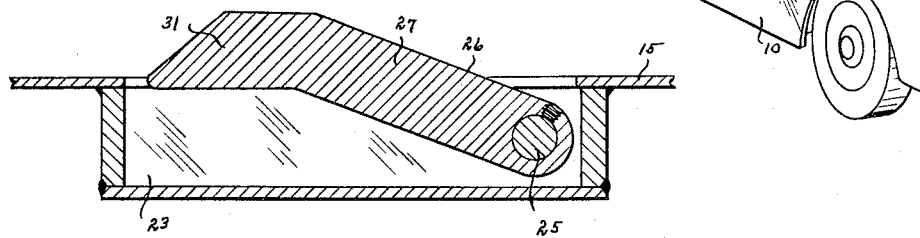

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a longitudinal sectional view of my dock platform taken on line 1—1 of FIG. 2, FIG. 2 is a top plan view of the center portion of the dock plate and more fully illustrates its construction, FIG. 3 is a longitudinal sectional view of the device taken on line 3—3 of FIG. 2, FIG. 4 is a perspective view of my dock plate being transported by a lifting tractor, and FIG. 5 is a longitudinal sectional view of my dock plate taken on line 5—5 of FIG. 2.

In the drawings I have used the numeral 10 to designate an ordinary tractor having the usual two hydraulically actuated lifting fork prongs 11 and 12. The numeral 13 generally designates an ordinary dock plate having the central section 15, the two approach sections 16 and 17, and a strengthening rib 19 at each side thereof, as shown in FIG. 4. It is to such equipment that I install my invention and which I will now describe in detail.

In the central area of the dock plate section 15, I form two spaced apart longitudinal elongated openings 20 and 21. The numeral 22 designates an elongated laterally extending opening in the section 15, connecting the two openings 20 and 21. This opening 22, connects the two openings 20 and 21 a short distance from the rear ends of the openings 20 and 21 as shown in FIG. 2. The numeral 23 designates a rectangular housing secured on the underside of the section 15 and which is below and communicates with the openings 20, 21 and 22. In the forward end of the housing 23 is a laterally extending shaft 25. The numeral 26 generally designates a U-shaped bail member having its two forward ends embracing the shaft 25. This bail member should either be rotatably mounted on the shaft 25, or else the shaft should be rotatably mounted in the housing 23 in order that the bail member may swing upwardly and downwardly. The two sides 27 and 29 of the bail member actuate in the openings 20 and 21, The center portion 30 of the bail may swing into the opening 22. On the rear of the side 27 is a projection 31. On the rear of the side 29 is a projection 32. These two projections 31 and 32 may swing into the rear areas of the openings and when they are in such positions they extend to the rear of the opening 22, as shown in FIG. 2. The two projections 31 and 32 have pointed ends and, when the bail member is horizontal extend downwardly and rearwardly relative to the sides 27 and 29 as shown in FIG. 1. The numeral 33 designates a U-shaped leaf spring embracing the shaft 25, and having one end engaging the inside bottom of the housing 23 and its other and upper end capable of being contacted by the center portion 30 of the bail member. This spring is limited in its yieldable spreading action by its upper portion engaging the underside of the central section 15 of the dock plate and which is forward of the opening 22. By this construction the spring will yieldingly hold the center portion 30 of the bail member above the top plane of the dock plate as shown in FIG. 3. This center portion 30 has its rear edge pointed as shown in FIG. 1, and when yieldingly held in an upward position by the spring 33, the under side of the portion 30 will extend rearwardly and upwardly. The bail member 26 may be swung to a vertical position as shown in FIG. 4 due to its two ends being hingedly secured. If the shaft 25 is to be rotatably mounted as shown in the drawings, bearing members 35 secured in the housing 23 may be used to rotatably embrace each end area of the shaft 25. The practical operation of the device is as follows:

The spring 33 will hold the bail member in an elevated position above the top plane of the dock plate as shown in FIG. 1. The tractor is driven toward the rear end of the dock plate and the lift prongs 11 and 12 are forced under the center section 30 of the bail member as shown in FIG. 4. The guiding of the prongs to position under the bail member is encouraged by the downwardly and forwardly slope of the portion 30 with the prongs in place under the bail it is merely necessary to lift the fork thereby moving the bail member to a vertical position and raising the entire dock plate so elevated, the tractor may easily transport the dock plate to its new location. Upon reaching such location, it is merely necessary to lower it and then back away from it until the fork prongs 11 and 12 clear the bail member. The bail member then will fall to a lowered position such as shown in FIG. 3 and will be so held by the leaf spring. In this position the projections 31 and 32 will have their upper surfaces extending downwardly and rearwardly as shown in FIG. 5. When the dock plate is in use any vehicle passing onto the dock plate from the rear will contact one or both of the projections 31 and 32, and will depress the entire bail member into the housing 23 and against the yielding action of the spring 33 after the vehicle has passed over the plate, the spring will return the bail member to its normal position shown in FIG. 5. When the bail member is in this position, the sides 27 and 29 will extend rearwardly and upwardly. Therefore if a vehicle moves from the forward end of the dock plate, the vehicle will engage one or both of the sides 27 and 29, and depress the entire bail member downwardly into the housing 23. Thus it is obvious that although the bail member is available for use in the lifting and transporting of the entire unit, the bail member does not interfere with traffic over the dock plate.

Some changes may be made in the construction and arrangement of my portable dock plate platform without departing from the real spirit and purpose of my invention, and it is my intention to cover by my claims, any modified forms of structure or use of mechanical equivalents which may be reasonably included within their scope.

I claim:

1. In a dock plate, a plate member having approach sections at opposite ends and an opening therebetween, a bail member in said opening having a center portion extending transversely of said plate member with an integral leg portion at either end, the free end of each leg portion hinged to said plate member along an axis extending transversely of said plate member at a level below the upper surface of the plate member, said bail member capable of swinging into and out of the opening in said plate member, yieldable means normally holding said bail member with said center portion out of said opening above the top surface of said plate member.

2. In a dock plate, a plate member having approach sections at opposite ends and an opening therebetween, a U-shaped bail member in said opening having a center portion extending transversely of said plate member with an integral leg portion at either end, the free ends of each leg portion hinged to said plate member at a level below the upper surface of said plate member along an axis extending transversely of said plate member, said bail member capable of swinging into and out of the opening in said plate member, and a spring means normally holding said bail member with said center position out of said opening above the top surface of said plate member, said center portion having a bottom tapered surface along its length, said tapered surface extending outwardly of the hinge axis and above the top surface of said plate member whereby the fork members of a fork lift truck or the like may move against the tapered surface of said center portion and pivot said bail member to a vertical position with the fork members moving under said center portion for said fork truck or the like to lift said plate member.

3. In a dock plate, a plate member having approach sections at opposite ends and an opening therebetween, a bail member in said opening having a center portion extending transversely of said plate member with an integral leg portion at either end, the free end of each leg portion hinged to said plate member along an axis extending transversely of said plate member at a level below the upper surface of the plate member, said bail member capable of swinging into and out of the opening in said plate member, a spring means normally holding said bail member with said center portion out of said opening above the top surface of said plate member; said center portion having its under side tapered along its length and extending upwardly from adjacent said top surface and at an angle to said top surface of said plate member and outwardly of said hinge axis when the said bail member is so held by said spring means, and at least one projection fixedly secured on said bail member outwardly from said center portion longitudinally of said plate when said bail member is so held by said spring means, and said projection having its top surface tapered outwardly from said center portion and downwardly towards said plate, said top surface terminating in a plane parallel and below the top surface of said plate when said bail member is being so held by said spring means and the top surface of said projection and the under side of said center portion being further defined as forming an obtuse angle therebetween and extending toward opposite approach sections of said plate member.

4. In a dock plate, a plate member having approach sections at opposite ends and an opening therebetween, a housing on the underside of said plate member and below its opening, a bail member having a center portion extending transversely of said plate member with an integral leg portion at either end, the free end of each leg portion hingedly secured within said housing at a level below the upper surface of said plate member and said bail member being capable of being swung upwardly through the opening in said plate member, or swung downwardly through the opening in said plate member into said housing, a spring in said housing for normally yieldingly holding said bail member in a position with a substantial part of said center portion above the top surface of said plate member, said center portion having its under side tapered along its length and extending upwardly from adjacent said top plane of said plate member and at an angle to said top plane of said plate member and outwardly of said hinge axis when said bail member is so held by said spring, and two projections fixedly secured on and extending outwardly from the center portion of said bail member and longitudinally of said plate member when so held by said spring means, each projection having its top surface tapered and extending downwardly towards said plate member at an obtuse angle to the under side of said center portion, said top surface terminating in said opening below the top plane of said plate member when said bail member is so held by said spring, and said top surface of each projection and the under side of said center portion being further defined as extending towards opposite approach sections of said plate member.

References Cited by the Examiner
UNITED STATES PATENTS

| | | | |
|---|---|---|---|
| 1,982,124 | 11/34 | Smith | 220—95 |
| 2,188,728 | 1/40 | Spencer | 220—95 |
| 2,461,678 | 2/49 | Christensen | 14—72 |
| 2,521,349 | 9/50 | Diamond | 14—72 |
| 2,728,483 | 12/55 | Smolen | 220—39 |

JACOB L. NACKENOFF, *Primary Examiner.*